(12) United States Patent
Hunt et al.

(10) Patent No.: US 9,201,458 B2
(45) Date of Patent: Dec. 1, 2015

(54) NUDGE NOTIFICATION VIA SHIFTING DEVICE BATTERY

(75) Inventors: John Miles Hunt, Raleigh, NC (US); John Weldon Nicholson, Cary, NC (US); Jennifer Greenwood Zawacki, Hillsborough, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 137 days.

(21) Appl. No.: 13/584,929

(22) Filed: Aug. 14, 2012

(65) Prior Publication Data

US 2014/0051484 A1  Feb. 20, 2014

(51) Int. Cl.
*H04B 1/38* (2015.01)
*G06F 1/16* (2006.01)
*H04M 1/02* (2006.01)

(52) U.S. Cl.
CPC ........... *G06F 1/1635* (2013.01); *H04M 1/0262* (2013.01)

(58) Field of Classification Search
CPC ............... H04M 1/0262; H04M 1/73; H04M 2001/0204; H04W 52/0261
See application file for complete search history.

(56) References Cited

U.S. PATENT DOCUMENTS

| 5,771,471 | A * | 6/1998 | Alberth et al. | 455/573 |
| 6,389,302 | B1 * | 5/2002 | Vance | 455/567 |
| 2005/0003860 | A1 * | 1/2005 | Jung | 455/557 |
| 2010/0153845 | A1 * | 6/2010 | Gregorio et al. | 715/702 |
| 2011/0077053 | A1 * | 3/2011 | Lee et al. | 455/566 |
| 2011/0133578 | A1 | 6/2011 | Choi | |
| 2012/0299839 | A1 * | 11/2012 | Lu | 345/173 |
| 2014/0161513 | A1 * | 6/2014 | Chellew et al. | 403/322.1 |

OTHER PUBLICATIONS

Forced Vibrations of Single-Degree-of-Freedom Systems, Jan. 2011 (8 pages).
Precision Microdrives, Linear Resonant Actuator, Jul. 2012 (6 pages).
Bland, H.C., Automated field testing of 3-C geophones using a 3-C microvibrator, 2003 (13 pages).

* cited by examiner

*Primary Examiner* — Keith Fang
(74) *Attorney, Agent, or Firm* — Brian J. Pangrle

(57) ABSTRACT

A device can include a processor; a display operatively coupled to the processor; a battery having a battery length; a chassis that includes a bay having a bay length, the bay length being of sufficient length to allow translation of the battery along the bay length; a translation mechanism to translate the battery in the bay; and communication circuitry operatively coupled to the processor and the translation mechanism. Various other apparatuses, systems, methods, etc., are also disclosed.

10 Claims, 11 Drawing Sheets

NUDGE NOTIFICATION VIA SHIFTING DEVICE BATTERY

TECHNICAL FIELD

Subject matter disclosed herein generally relates to technology for notification.

BACKGROUND

Various types of devices include a notification mechanism such as a speaker, a buzzer, or a display. For example, a mobile phone may include a display that lights up once a phone call is received. Such a phone may also include a speaker or a buzzer that emit audio. Another example is a rotational vibrator that rotates an eccentric mass. Yet another example is a magnetic field vibrator that generates a resonant frequency magnetic field in a coil that vibrates due to interaction with a permanent magnet. Various technologies and techniques described herein pertain to mass shifting notification.

SUMMARY

A device can include a processor; a display operatively coupled to the processor; a battery having a battery length; a chassis that includes a bay having a bay length, the bay length being of sufficient length to allow translation of the battery along the bay length; a translation mechanism to translate the battery in the bay; and communication circuitry operatively coupled to the processor and the translation mechanism. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
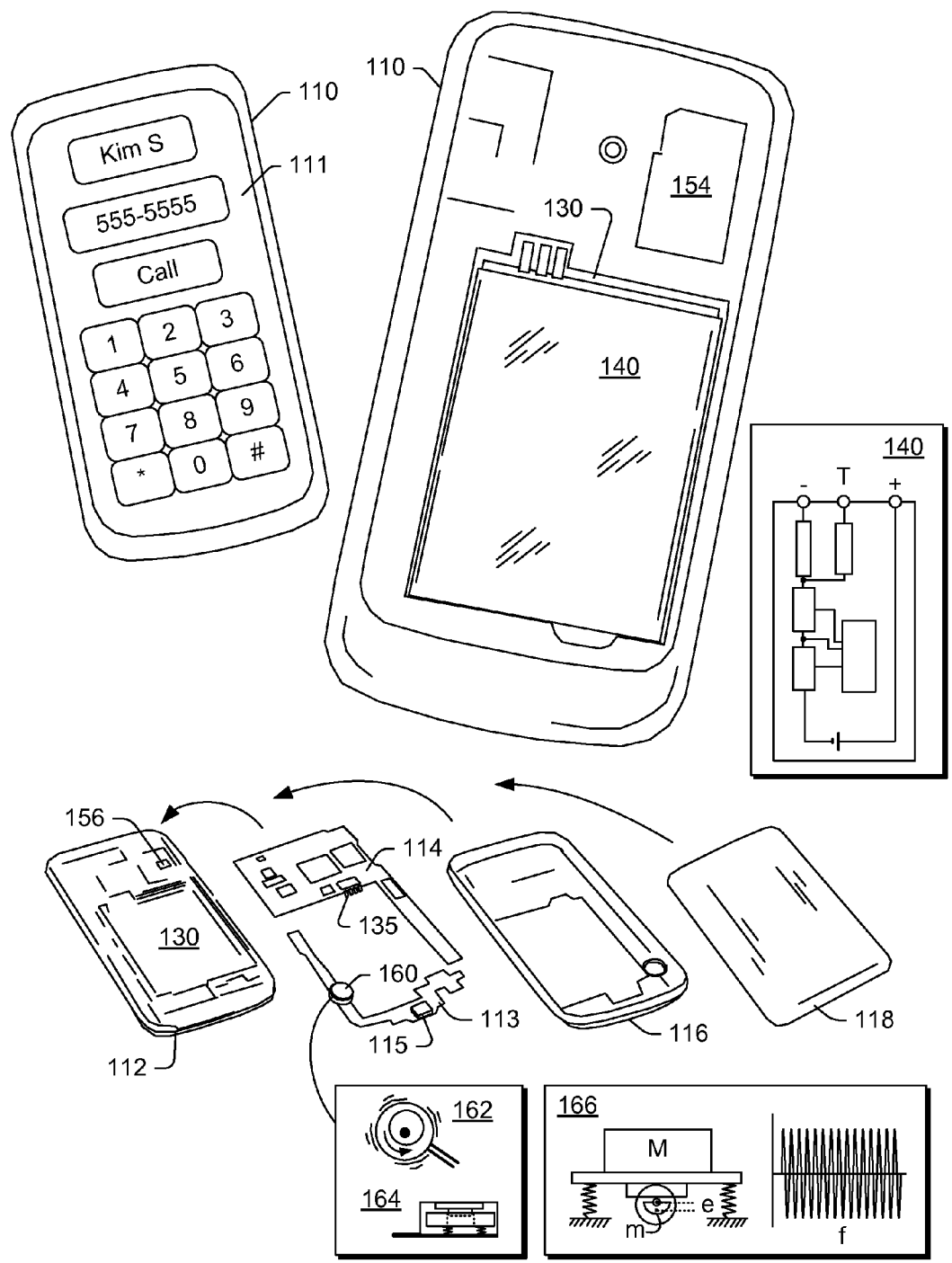
FIG. 1 is a diagram of an example of a mobile device and associated circuitry.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As mentioned, various types of devices include a notification mechanism. As to the aforementioned rotational vibrator that rotates an eccentric mass and magnetic field vibrator that generates a resonant frequency magnetic field in a coil that vibrates due to interaction with a permanent magnet, when implemented in a mobile device such as a phone, these types of vibrators are fixed to a board (e.g., a circuit board) and have a cylindrical shape with a diameter less than about one centimeter or a rectangular shape with a length of about one centimeter and a total mass of a few grams (e.g., about 2 grams). Thus, the mass of such vibrators is a small fraction of the total mass of a mobile device such as a phone (e.g., a very light phone may have a mass of about 50 grams). As to a rotational vibrator, planar, 2-D forces may be defined as $F=m*\omega^2*r$, $F_x=F*\sin(\omega t)$ and $F_y=F*\cos(\omega t)$ where m is the mass of the rotating eccentric, $\omega$ is the rotational velocity and r is the radius of rotation (e.g., axis to center of mass). As to the magnetic field vibrator, it generates an alternating force at a resonant frequency normal to the magnetic field induction coil (i.e., via interaction with a permanent magnet positioned along the normal). As to frequency, such vibrators may vibrate at frequencies of about 100 Hz to about 200 Hz.

For a rotational vibrator, a DC voltage may control speed of a shaft of a motor and hence frequency of an eccentric (e.g., a sinusoid input). Such a vibrator may be modeled where "displacement" is approximated as being limited to a single degree-of-freedom (DOF). Such a single DOF vibration model can be shown as a mass, connected to a spring, with a damping factor with an equation of motion as follows: $(M-m)*(d^2x/dt^2)+c*(dx/dt)+kx=F_0*\sin(\omega t)$, where m is mass of the rotating eccentric, x is displacement of non-rotating mass (M−m), M is mass of a body, k is a stiffness constant, c is a damping constant, and $F_0$ is the centripetal force of the eccentric (e.g., $F=m*\omega^2*r$). As an approximate analogy, consider spinning of an unbalanced load of laundry in a cylindrical basket of a front loading washing machine where displacement is considered to be restrained to up and down movement of the washing machine.

To ease comparison of rotational vibrators some manufacturers provide "nominal vibration" (e.g., peak-to-peak "normalized amplitude") values expressed in units of G (acceleration relative to 9.8 m/s$^2$) relative to a 100 g mass (e.g. a mobile phone). For example, a rotational vibrator may have a peak-to-peak nominal vibration of around 0.5 G to about 1.5 G.

Vibration mechanisms such as the aforementioned rotational vibrator and magnetic field vibrator have been implemented for haptic feedback such as "silent" notifications in mobile devices. As to "silence", when placed on a hard surface, such a mobile device may make considerable noise (e.g., via repeated contacts with the hard surface) associated with modes of the frequencies (e.g., 100 Hz to 200 Hz) and, if carried in a purse, bag, etc., such a "silent" vibrator may be insufficient for purposes of notification. For example, a purse may have a mass of about 1,500 g including a mobile device having a mass of about 150 g. If that mobile device includes a rotational vibrator (i.e., fixed to a circuit board in the device) assuming a rotational mass of 1 g (0.001 kg) with an eccentricity of 0.1 cm (0.001 m) and a rotational frequency of about 150 Hz (942 radians/s), the sinusoidal force vector is less than 1 N (i.e., rotating at about 9000 rpm). In such an example, rotation of the 1 g mass is unlikely to shift center of mass or position of the mobile device in the purse.

FIG. 1 shows an example of a mobile device 110 that includes a display 111, which may be a touch display for input of information (e.g., via a key pad, control graphics, etc.) and output of information, for example, with a resolution of 1280×720 pixels (e.g., with a density of about 300 pixels per inch). As shown, the mobile device 110 includes various components including a display frame 112 with a bay 130 and display graphics circuitry 156 (e.g., optionally including touch and gesture circuitry). The display frame 112 can receive circuitry components 113 and 114, which may carry items such as a vibrator 160 (e.g., fixed to the component 113), a SIM slot, main processor, audio circuitry (e.g., for notifications such as ringtones, etc.), power management circuitry, motion processing circuitry (e.g., accelerometer, gyroscope), modem circuitry, pressure sensor circuitry, multiband power amplification circuitry, memory (e.g., SDRAM, etc.), wireless LAN circuitry, smart card circuitry, transmitter circuitry, and GPS circuitry. As to the main processor, a single or multi-core processor may be provided that includes memory (e.g., RAM and optionally other memory). In the example of FIG. 1, the circuitry component 113 includes the vibrator 160 and a connector 115 (e.g., for power and information) and the circuitry component 114 includes a connector 135 for connecting a battery 140 disposed at least partially in the bay 130. A cover 116 may cover the circuitry components 113 and 114 as seated with respect to the display frame 112 and a door 118 may be positioned with respect to the cover 116, for example, to provide for insertion and removal of the battery 140 and a SIM 154.

Various components, upon assembly may form a chassis. For example, the mobile device 110 as shown without the door 118 may be considered a chassis, which includes a bay 130 for receipt of the battery 140. In such an example, the components 112, 113, 114 and 116 may form the chassis. Other configurations are possible for forming a chassis, for example, consider a so-called flip or clamshell as an electronics form factor that includes a chassis with a bay for a battery. In such an example, two or more sections may fold via a hinge or hinges where if a hinge is on a long edge the device may be referred to as a clamshell device rather than a flip device (e.g., hinge on a short edge).

In the example of FIG. 1, the mobile device 110 may have a mass of about 135 g, including the battery 140, and dimensions of about 135 mm×70 mm×9 mm. As to the battery 140, it may have a mass of about 40 g and dimensions of about 65 mm×45 mm×2 mm (e.g., part no. EB-L1F2HVU). The battery 140 may optionally include circuitry for Near Field Communication (NFC) (e.g., an antenna, etc.). As to the connector 135, it may include a number of contacts that correspond to those of a battery, for example, based on functionality.

As an example, a battery may include a positive contact and a negative contact and optionally one or more of a temperature contact and a bus contact (e.g., single wire or other bus). As shown in the example of FIG. 1, the battery 140 can include circuitry, which may be digital, analog or digital and analog. A battery may include one or more cells and may be a lithium-based battery or other type of battery.

In the example of FIG. 1, the vibrator 160 may be a rotational vibrator 162 or a magnetic field vibrator 164 (i.e., fixed to a circuit board or otherwise fixedly seated), each of which may be modeled according to a single degree-of-freedom model 166 with stiffness and damping characteristics as excited by a sinusoidal input frequency in a range of about 100 Hz to about 200 Hz.

The vibrator 160 may be limited in its ability to generate readily distinguishable notifications using a small internal mass. For example, a fixed frequency motor may be capable of rotating a mass to produce patterns as combinations of on and off periods. Any vibration pattern that is not very simple may quickly lose value due to the time required to execute it and the possibility of the user missing parts of the sequence. As to frequency variation, modes of vibration (e.g., harmonic modes per a modal analysis) tend to be quite complex for vibrators such as the vibrators 162 and 164 and such modes may not be readily distinguishable to a human.

As an example, another type of approach may leverage potential energy to move a larger mass, for example, at a lower frequency. Such an approach may, by moving a mass, shift the center of mass (e.g., barycenter) of a mobile device. Such an approach may optionally be configured to give a user a quiet but still forceful "nudge". As an example, a battery of a mobile device may be a movable mass that can be moved to shift the center of mass of a mobile device.

The center of mass or barycenter is a weighted average location of all the mass in a body or group of bodies. For a rigid body (e.g., a solid body), the center of mass is fixed in relation to the body, which may not necessarily coincide with a geometric center. As an example, the center of mass of a mobile device may be modeled via equations of motion and optionally provide a reference point for other calculations in mechanics, such as angular momentum and moment of inertia. A center of mass frame of reference may be an inertial frame of reference in which center of mass of a system is at rest at the origin of the coordinate system. As an example, such a system may include a mobile device and a movable battery.

As to an example where a battery is movable, the battery may be configured to slide on a sliding mount inside a mobile device where the mobile device includes circuitry powerable by the battery via at least some of the contacts (e.g., a positive and a negative contact). Such a sliding mount may provide for making contact between the contacts of the battery and contacts of the mobile device. As an example, a mount may include tracks that allow for moving a battery as a mass along the tracks to create a "nudge" effect.

As an example, a mechanism for moving a mass (e.g., a battery) can include a track gear and motor. For example, a motor may act on a track gear to move a mass from one end of the track to another. As another example, potential energy stored in a rubber band or spring (e.g., elastic element) may be used to move a battery, for example, with retention clips, magnets, etc. Such an approach may allow for quick acceleration and have limited power consumption (e.g., consider power for releasing a clip, a magnet, etc.). As yet another example, potential energy may be stored in compressed gas. In such an approach, a battery chamber may be sealed or may include sealed balloons. As an example, compressed gas may be shunted from one side of a chamber to another or from one sealed balloon to another to cause a battery to shift. If recharging of the compressed gas is desired, as an example, a small press-pump may be provided.

Figure 2:
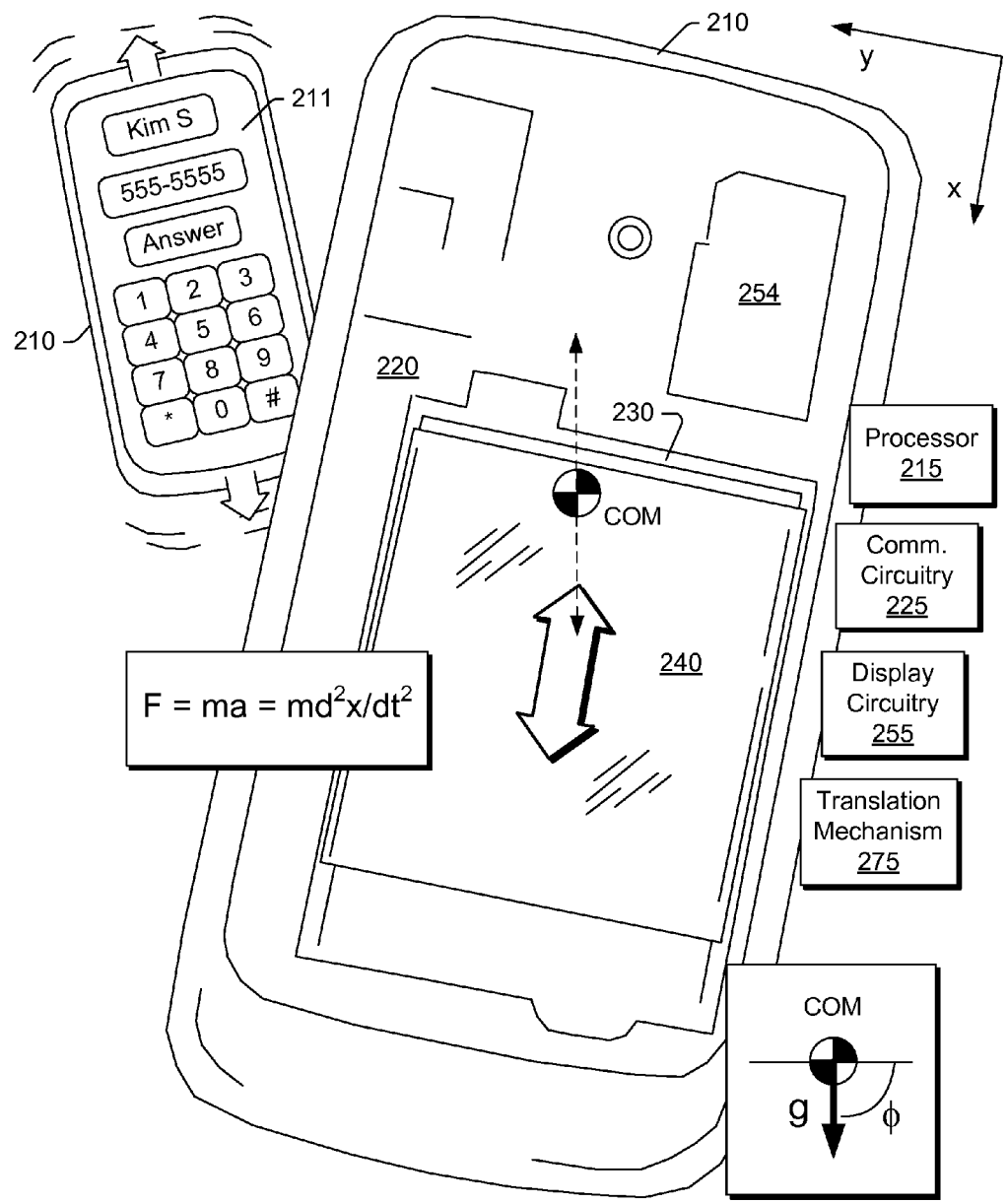
FIG. 2 is a diagram of an example of a mobile device that includes an example of a mass shifting mechanism.

FIG. 2 shows an example of a mobile device 210 that includes a display 211, a processor 215, a chassis 220, communication circuitry 225, a bay 230, a SIM socket 254 and a translation mechanism 275. The mobile device 210 may also include a door such as the door 118 of the device 110 of FIG. 1 that attaches to the chassis 220 (e.g., to cover the bay 230). In the example of FIG. 2, a battery 240 is disposed, at least partially, in the bay 230. As indicated, the size of the bay 230 is greater than the size of the battery 240. Accordingly, the battery 240 can move in the bay 230 (e.g., as indicated by a large double-headed arrow), for example, via action of the translation mechanism 275. FIG. 2 also shows an approximate center of mass (COM) marker, which may shift responsive to movement of the battery 240 in the bay 230. As indicated, depending on where the battery 240 is placed in the mobile device 210, the center of mass may shift in a direction (see dashed line) different than that of the battery 240 in the bay 230 (e.g., as guided in the bay 230).

As an example, a device (e.g., such as the device 210) may include an overall length of about 135 mm, a bay length of about 70 mm and a battery with a length of about 45 mm to provide about 25 mm of battery movement via a translation mechanism (e.g., about 20% of overall device length and about 35% of bay length). In such an example, the battery may have a mass of about 20% of the total device mass (e.g., about 30 g where total device mass including the battery may be about 120 g and, e.g., where the device may have a width of about 70 mm and the battery may have a width of about 45 mm). Specifications (e.g., dimensions, mass, etc.) of a device that includes mass shifting notification (e.g., via a battery or batteries) may be selected based on any of a variety of factors (e.g., overall size/mass, battery/power requirements, types of notifications desired, environment of use, functionality, etc.). As an example, a mass shift distance greater than about 3% (e.g., greater than a few millimeters) and less than about 20% of an overall length or an overall width (e.g., for a widthwise shift) of a device may suffice for purposes of notification, for example, notification achieved via changing a center of mass, generating momentum (e.g., product of mass and velocity), generating force (e.g., product of mass and acceleration), etc.

In the example of FIG. 2, a diagram of center of mass (COM) of the mobile device 210 is shown with respect to a horizontal plane and acceleration of gravity (g). An angle ϕ is shown to indicate how the mobile device 210 may be oriented with respect to gravity (g). As an example, dynamics of the mobile device 210 with the battery 240 disposed at least partially in the bay 230 may depend on orientation of the mobile device 210 and the battery 240 with respect to gravity. In the example of FIG. 2, where the battery 240 moves in a plane, for example, parallel to a plane defined by the display 211 (e.g., an x,y-plane), the battery 240 and the mobile device 210 may be at the same angle ϕ with respect to gravity (g). Where the direction of movement of the battery 240 is along an x-axis, force may be modeled by mass of the battery 240 and along the x-axis. Additionally, the weight of the battery 240 may be modeled with respect to gravity (g). As an example, a model may account for acceleration due to a translation mechanism or other mechanism and acceleration due to gravity.

As an example, when the mobile device 210 is held in a hand of a user, movement of the battery 240 in the bay 230 can shift the center of mass (COM) of the mobile device 210 (e.g., with respect to time) and cause a "tilt" feeling in the hand of the user. For movement of the battery 240 back and forth along the x-axis, a user may experience rocking of the mobile device 210. A frequency, period, etc., of the rocking may depend on one or more factors, for example, such as type of notification (e.g., phone call, email, timer, appointment, etc.). Further, duration and number may be controlled to provide for various notification signals (e.g., six shifts over three seconds, one shift every five seconds, etc.).

As an example, the mobile device 210 may include circuitry to associate notifications and movement schemes for moving the battery 240. Such circuitry may be programmable (e.g., selectable), for example, via receipt of user input (e.g., via voice, touch, etc.). As an example, a notification may be associated with an application such as a game, a calendar, a GPS, etc. As an example, for wireless communications via a cellular network, circuitry may provide for user association of numbers, contacts, etc., with one or more particular movement schemes for purposes of notification.

Figure 3:
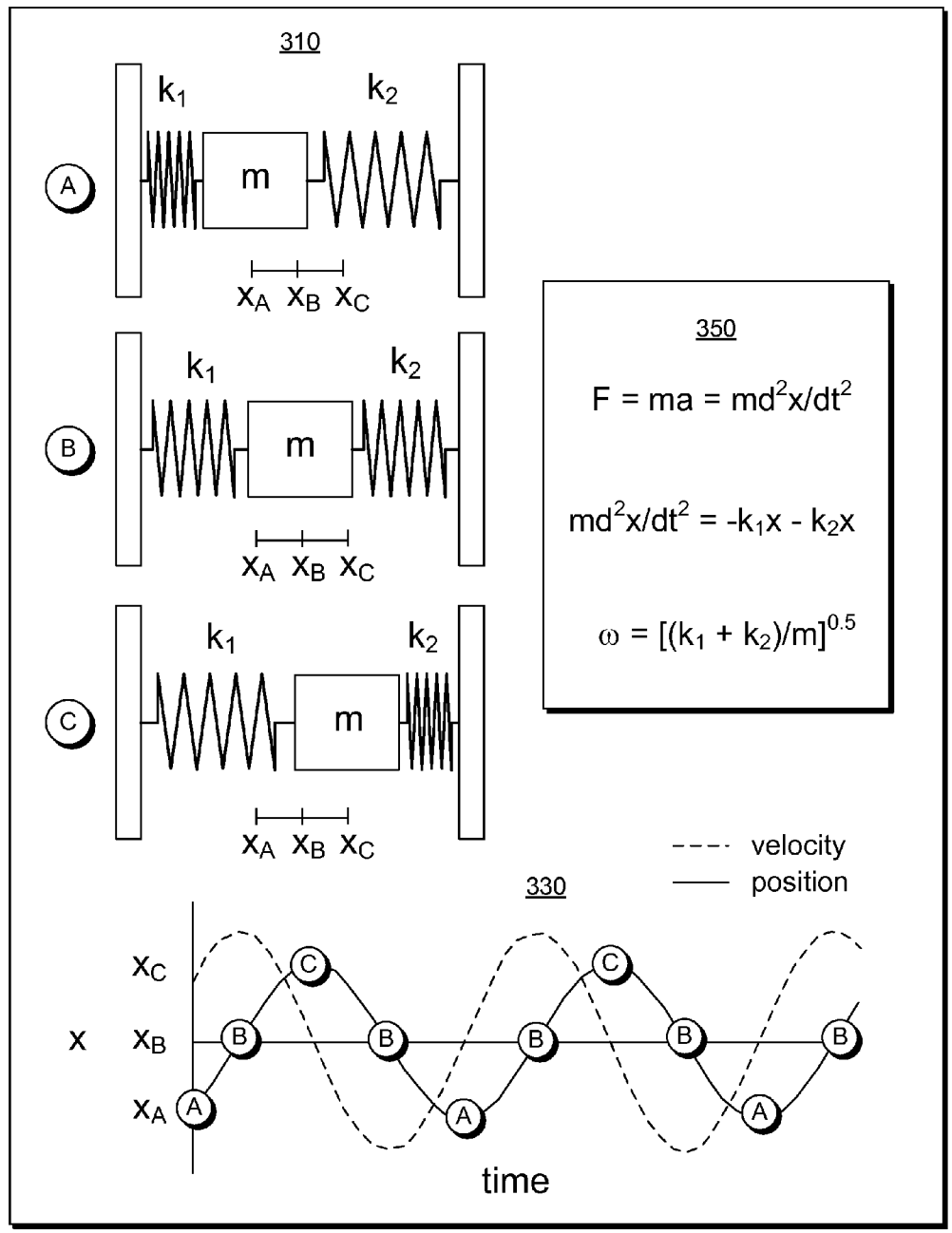
FIG. 3 is a diagram of an example of a mass and two springs.

FIG. 3 shows an example of an arrangement of a mass with two springs 310, an example of a plot of displacement (e.g., position) and velocity with respect to time 330 and some examples of equations 350. As shown in the arrangement of the mass and the two springs 310, the mass can move between positions $x_A$ and $x_C$, where position $x_B$ may be considered an equilibrium position or a mid-point, for example, depending on the values of the spring constants $k_1$ and $k_2$.

As an example, a mass may be set into motion from a displaced state where potential energy of a spring or springs is converted to kinetic energy. For example, if the mass is positioned at $x_A$ and then released, where the two springs have the same spring constant (e.g., $k_1 = k_2$), the mass will move with respect to time as shown in the plot 330 (e.g., without damping due to friction, etc.). The equations 350 include an equation for angular velocity ω, as being dependent on the spring constants $k_1$ and $k_2$ and mass.

As an example, consider a mass with springs attached at opposing ends where each of the springs is also attached to a respective surface or immovable wall. In such an example, a displacement of the mass to results in one of the springs lengthening and pulling in a direction toward the wall to which that spring is attached while the other spring is compressed and pushing in that same direction. Thus, in such an example, both springs store potential energy (e.g., one in tension and one in compression). As to potential energy, it may be defined as an energy difference between energy of the mass in a given position and its energy at a reference position. In the plot 330, potential energy and kinetic energy cycle as the mass moves toward one end to the other. Work of an elastic force, as associated with an elastic mechanism, may be referred to as elastic potential energy (e.g., due to stress), work of a gravitational force may be referred to as gravitational potential energy (e.g., potential energy due to an elevated position) and work of work of the Coulomb force may be referred to as electric potential energy. Potential energy may be defined as a function of a state a system and depend on relative positions of components.

As an example, a device can include a processor, a display operatively coupled to the processor, a battery having a battery length, a chassis that includes a bay having a bay length, the bay length being of sufficient length to allow translation of the battery along the bay length, a translation mechanism to translate the battery in the bay; and communication circuitry operatively coupled to the processor and the translation mechanism. For example, consider the mobile device 210 as including the processor 215, the display 211 operatively coupled to the processor 215, the battery 240 having a battery length, the chassis 220 as including the bay 230 having a bay length, the bay length being of sufficient length to allow translation of the battery 240 along the bay length, the translation mechanism 270 to translate the battery 240 in the bay 230 and the communication circuitry 225 operatively coupled to the processor 215 and the translation mechanism 270. In such an example, circuitry (e.g., the communication circuitry 225, the processor 215, etc.) may cause the translation mechanism 275 to translate the battery 240 in the bay 230 and thereby shift the center of mass of the mobile device 220.

As an example, a battery may be a lithium ion battery, optionally including more than one cell. As an example, a translation mechanism may be a bi-directional translation mechanism. As an example, a translation mechanism may include one or more springs. As an example, a battery may have a battery mass that is optionally at least about 20% of a total mass of a device (e.g., a mobile device powerable by the battery). As an example, a center of mass calculation may be performed to determine how movement of a battery may shift center of mass of a device (e.g., optionally for purposes of a user to associate a movement scheme with a notification). In such an example, for a particular device, specifications may be available from the device, a network resource, etc., for example, as to device mass, battery mass, etc. As an example, communication circuitry can include activation circuitry to, responsive to receipt of a communication signal, activate a translation mechanism.

As an example, a device can include a rotatable eccentric mass, for example, where communication circuitry is operatively coupled to the rotatable eccentric mass (e.g., to activate a motor or other circuitry for rotating the eccentric mass). As an example, a device can include a vibrator (e.g., rotational vibrator or magnetic field vibrator), for example, where communication circuitry is operatively coupled to the vibrator (e.g., to activate a motor or other circuitry for vibration). As an example, one or more synergistic notifications may be formed by combining a shifting of mass scheme with a vibrator scheme. For example, a sequential scheme may include notification via a vibrator followed by notification via a shifting battery (e.g., a tiered notification scheme). As another example, consider shifting a battery in a bay of a device while actuating a vibrator of the device, the latter of which may, for example, help to overcome frictional force(s) between the device and one or more surfaces (e.g., to enhance movement of the device if so desired). Such an example may be referred to as a "simultaneous" notification scheme (e.g., two different types of notification mechanisms used over a period of time). As yet another, example, where two different notifications coincide (e.g., a timer and a phone call), one may be via a vibrator and the other via mass shifting (e.g., of a battery). In such an example, where a device is handheld, a user may be able to distinguish each of these notifications to understand that notifications are being issued for multiple events.

As an example, a device can include a rail where, for example, a battery is coupled to the rail to guide translation of the battery in a bay of a chassis of the device. As an example, a device can include a translation mechanism that includes a releasable latch mechanism to latch a battery to achieve a stationary state of the battery in a bay of a chassis of the device and to unlatch the battery to achieve a translational state of the battery in the bay of the chassis of the device. As an example, a releasable latch mechanism can include latches to latch a battery to achieve a stationary state of the battery in a bay of a chassis of the device toward either one of opposing ends of the bay.

As an example, a translation mechanism can include at least one gas chamber. As an example, a translation mechanism can include at least one potential energy storage component. As an example, a translation mechanism can include at least one potential energy to kinetic energy conversion component.

As an example, a method can include providing a store of potential energy; providing a battery toward an end of a bay; receiving a signal; and responsive to receipt of the signal, converting the potential energy to kinetic energy by moving the battery toward another end of the bay. In such a method, as an example, the signal may be a communication signal (e.g., a wireless communication signal associated with an email, a phone call, etc.). As an example, a signal may be a notification signal (e.g., an event, a timer, etc.). As an example, a method can include, after converting potential energy to kinetic energy, latching a battery toward one of opposing ends of a bay.

As an example, an apparatus can include a housing; a display coupled to the housing; communication circuitry coupled to the housing; a bay, formed at least in part by the housing, that includes a guide to guide movement of a component along a length of the bay; springs at opposing ends of the bay to apply forces to the component; and a releasable latch to latch the component at a stationary position along the length of the bay and to release the component for movement of the component along the length of the bay. In such an apparatus, as an example, the releasable latch can be optionally releasable responsive to receipt of a signal issued by the communication circuitry. As an example, an apparatus can include a component that may be a slidable cart configured for receipt of a battery or a battery.

Figure 4:
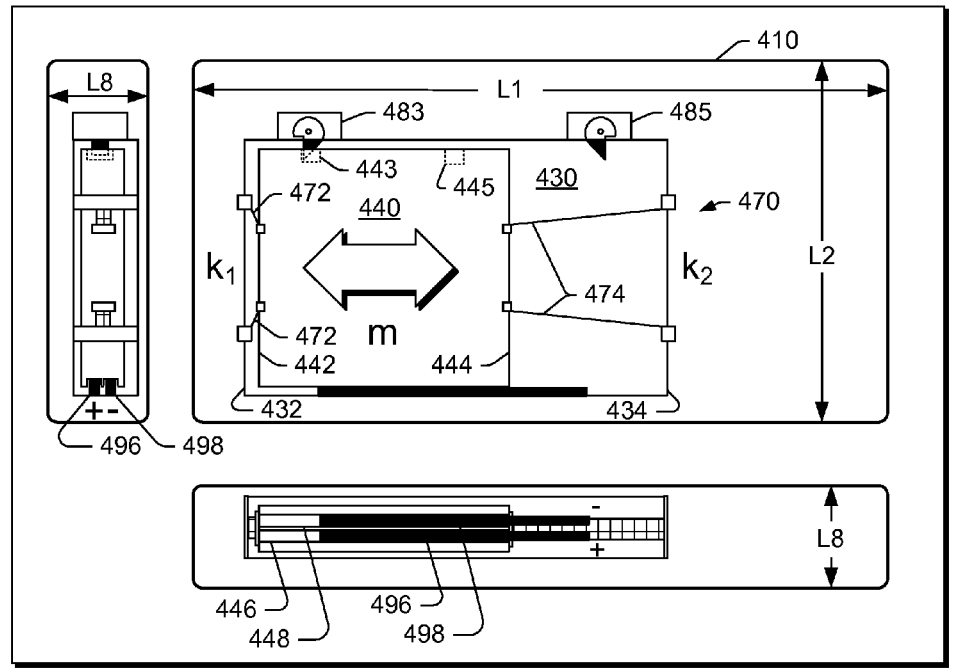
FIG. 4 is a diagram of an example of a device that includes a translation mechanism to translate a battery.
Figure 4:
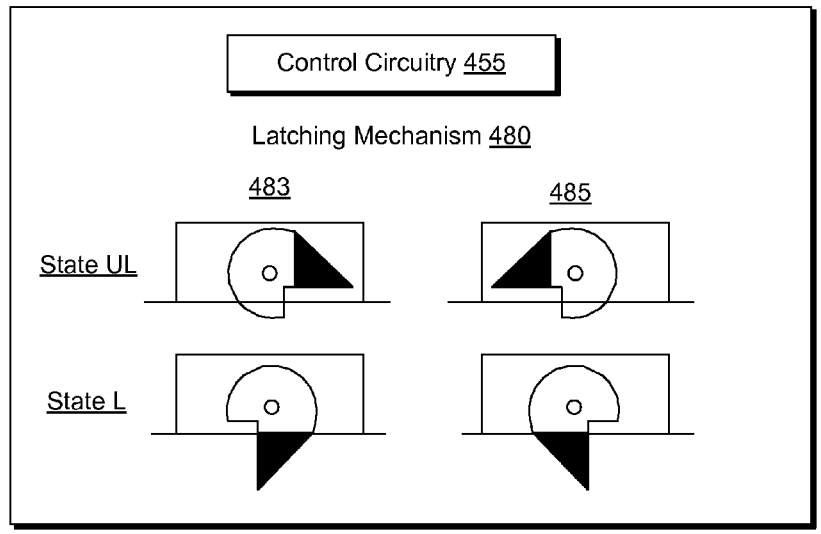

FIG. 4 shows an example of a device 410 in a plan view and side views along with various dimensions L1, L2 and L8. In the plan view, the device 410 includes a length L1 and a width L2; whereas, in the side views, the device 410 includes a height L8. Disposed within a volume defined by L1, L2 and L8 is a bay 430, a translation mechanism 470 and a latching mechanism 480, which may be part of the translation mechanism 470. Disposed within the bay 430, is a battery 440 that cooperates with the translation mechanism 470 and the latching mechanism 480. For example, the latching mechanism 480 may latch the battery 440 at a position or positions within the bay 430 and the translation mechanism 470 may translate the battery 440 in the bay 430, for example, to shift a center of mass of the device 410. In the example of FIG. 4, control circuitry 455 may control the latching mechanism 480 to thereby control the translation mechanism 470 and translation of the battery 440 in the bay 430.

In the example of FIG. 4, the translation mechanism 470 includes elastic components 472 and 474. The elastic components 472 attach an end 442 of the battery 440 to an end 432 of the bay 430 while the elastic components 474 attach another end 444 of the battery 440 to another end 434 of the bay 430. The latching mechanism 480 includes a latch 483 that cooperates with a socket 443 of the battery 440 and another latch 485 that cooperates with another socket 445 of the battery 440. For example, the latch 483 may include an extension that extends into the bay 430 for receipt by the socket 443 of the battery 440 to latch the battery 440 at a position within the bay 430 while the latch 485 may include an extension that extends into the bay 430 for receipt by the socket 445 of the battery 440 to latch the battery 440 at a different position within the bay 430. In either of the latched positions, the elastic components 472, 474 or 472 and 474 may be stressed to store potential energy. Accordingly, when one of the latched (State L) latches 483 or 485 is unlatched (State UL), the stored potential energy may be converted to kinetic energy by moving the battery 440 in the bay 430 to shift the center of mass of the device 410. The control circuitry 455 may be configured to control the latches 483 and 485 to transition from a latched to an unlatched state and, for example, from an unlatched state to a latched state.

In the example of FIG. 4, the device 410 includes contacts 496 and 498, which may contact contacts 446 and 448 of the battery 440. Such contacts may be in the form of slots and rails, for example, including conductive material such that power stored by the battery 440 may be available to power electronic circuitry of the device 410 and, for example, to allow charging of the battery 440 (e.g., when the device 410 is coupled to an external power source). In the example of FIG. 4, the contacts may act to guide movement of the battery 440 in the bay 430. While the example of FIG. 4 shows contacts 446, 496 and 448, 498 for positive contacts and negative contacts, respectively, where additional contacts are desired (e.g., for a bus, a temperature circuit, etc.), additional features may be included for making such contacts. As an example, a single rail may be provided to fit in a single slot, for example, where an end and a side, two sides, etc., provide for contacts.

Figure 5:
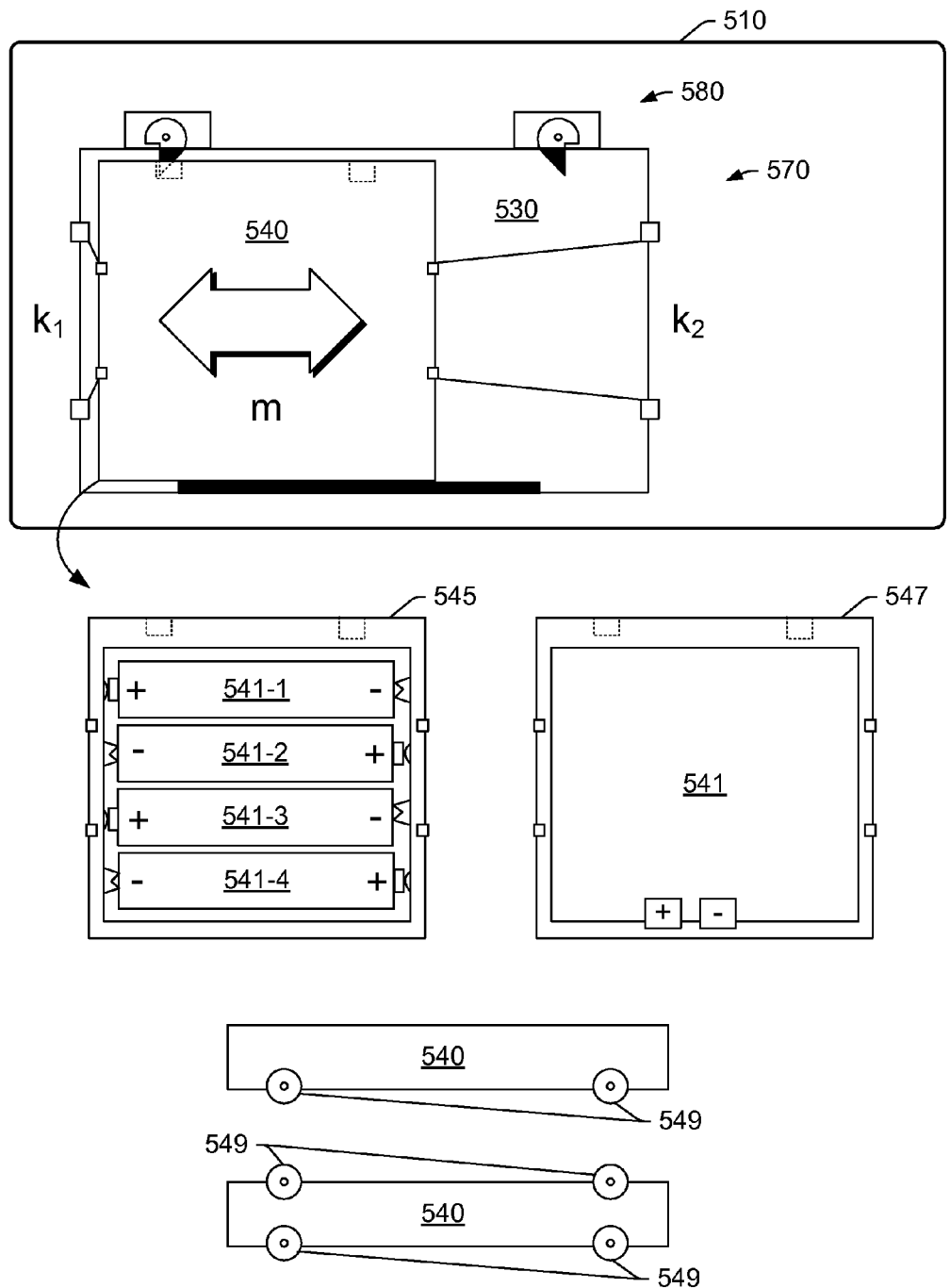
FIG. 5 is a diagram of an example of a device that includes a battery assembly.

FIG. 5 shows an example of a device 510 as including a bay 530, a battery assembly 540, a translation mechanism 570 and a latching mechanism 580, which may be part of the translation mechanism 570. In the example of FIG. 5, the battery assembly 540 may include a cart such as the cart 545 or 547. Such carts may further include one or more rollers 549 to reduce friction for movement of the battery assembly 540 in the bay 530. As another example, a bay may include one or more rollers to reduce friction or both a battery assembly and a bay may include rollers to reduce friction. As to the cart 545, it may be configured to receive batteries such as the batteries 541-1 to 541-4; whereas, the cart 547 may be configured to receive a single battery such as the battery 541.

Figure 6:
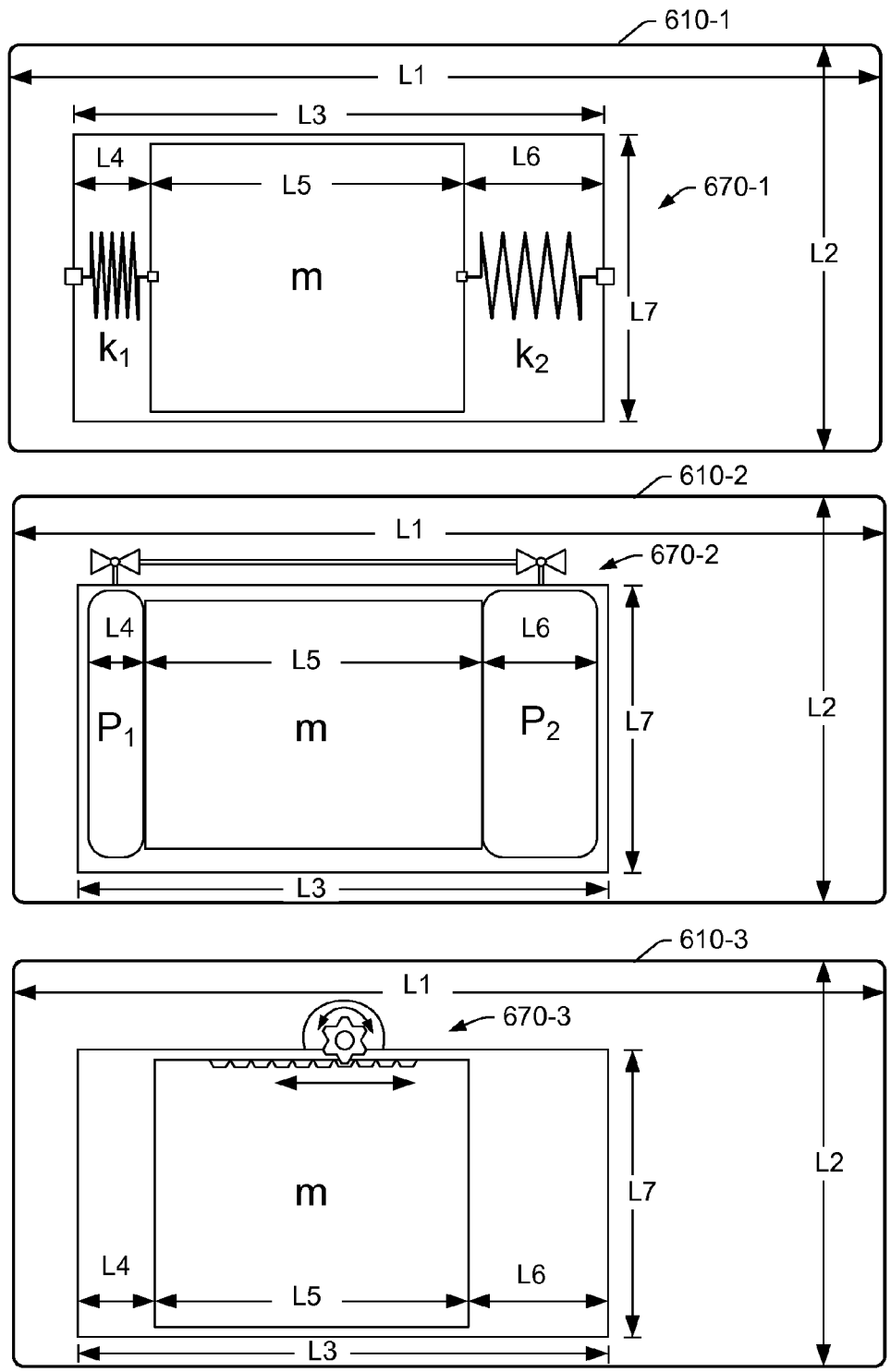
FIG. 6 is a diagram of examples of translation mechanisms.

FIG. 6 shows example of devices 610-1, 610-2 and 610-3, each including a translation mechanism 670-1, 670-2 and 670-3, respectively. Further, various dimensions are shown from L1 to L7. In the example of FIG. 6, L3 represents a bay length and L7 represents a bay width and L4, L5 and L6 represent dimensions along the bay length L3.

The translation mechanism 670-1 of the device 610-1 includes springs where each spring has a respective spring constant ($k_1$, $k_2$). The translation mechanism 670-2 of the device 610-2 includes chambers or balloons coupled via a conduit that includes one or more valves where the chambers or balloons may be pressurized at respective pressures ($P_1$, $P_2$). The translation mechanism 670-3 of the device 610-3 includes a rotating gear that cooperates with sockets (e.g., a rack and pinion mechanism), where the gear may be driven by an electric motor, a spring, etc. Where such a gear is driven by an electric motor, a battery may provide for electrical potential energy to power the motor and thereby translate the battery in a bay (e.g., conversion of potential energy to kinetic energy).

Figure 7:
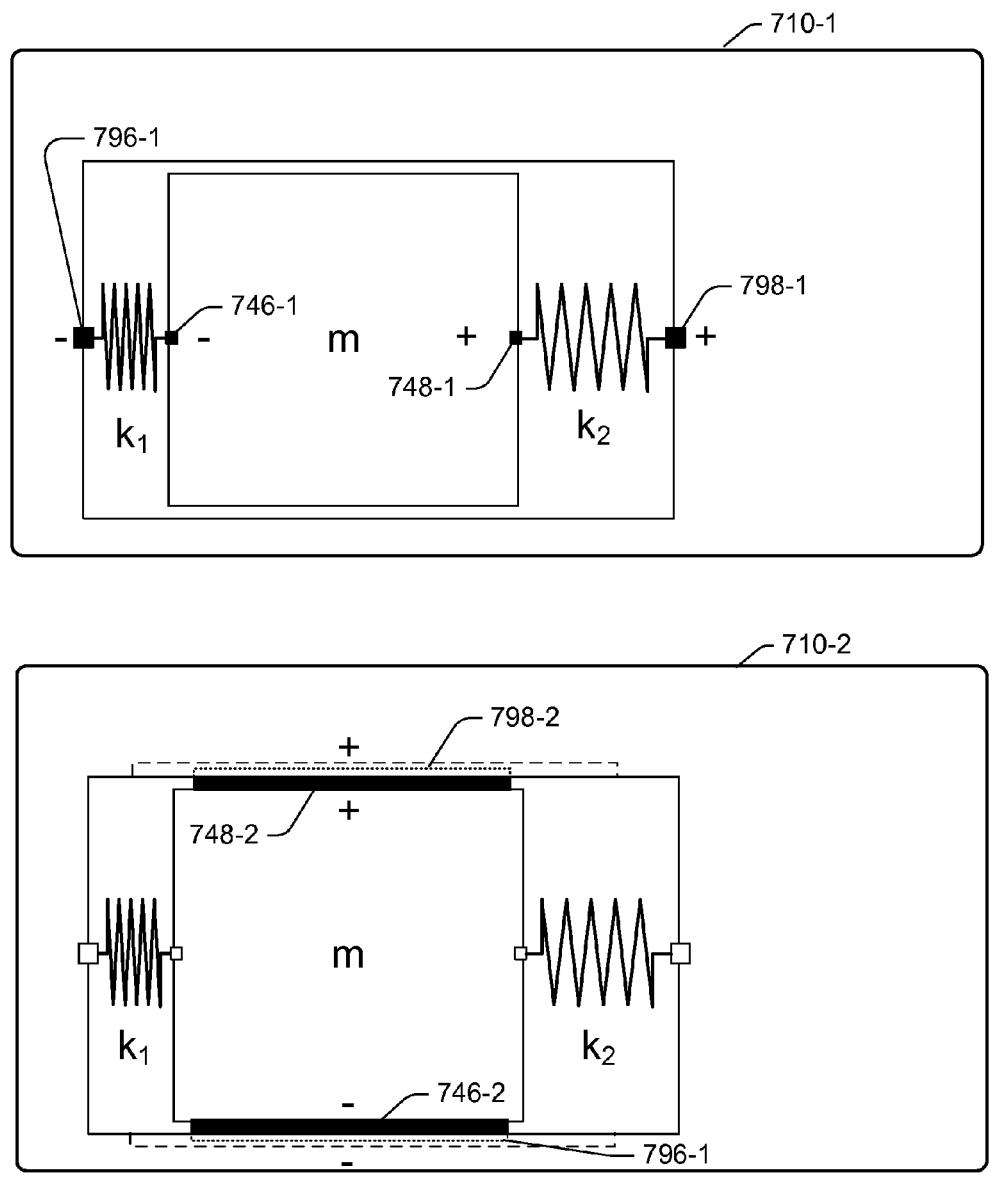
FIG. 7 is a diagram of examples of contacts for a battery and a device.

FIG. 7 shows examples of devices 710-1 and 710-2, each including contacts. For the device 710-1, springs made of electrically conductive material may provide for making contact between contacts of a battery 746-1, 748-1 and contacts 796-1, 798-1 of the device 710-1, for example, to power the device 710-1, for the device to recharge the battery, etc. For the device 710-2, side contacts 746-2, 748-2 of a battery may provide for making contact with contacts 796-1, 798-1 of the device 710-2.

Figure 8:
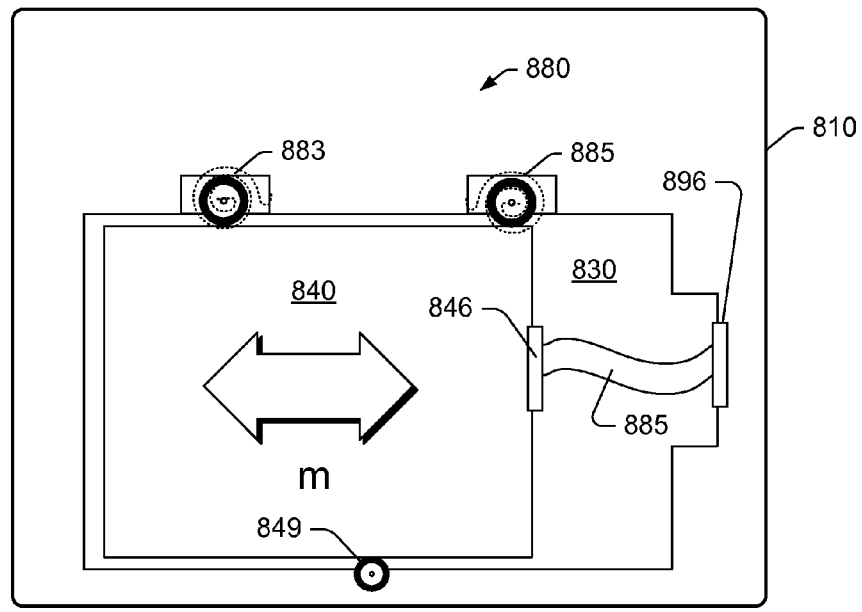
FIG. 8 is a diagram of an example of a device that includes one or more windable and unwindable springs.
Figure 8:
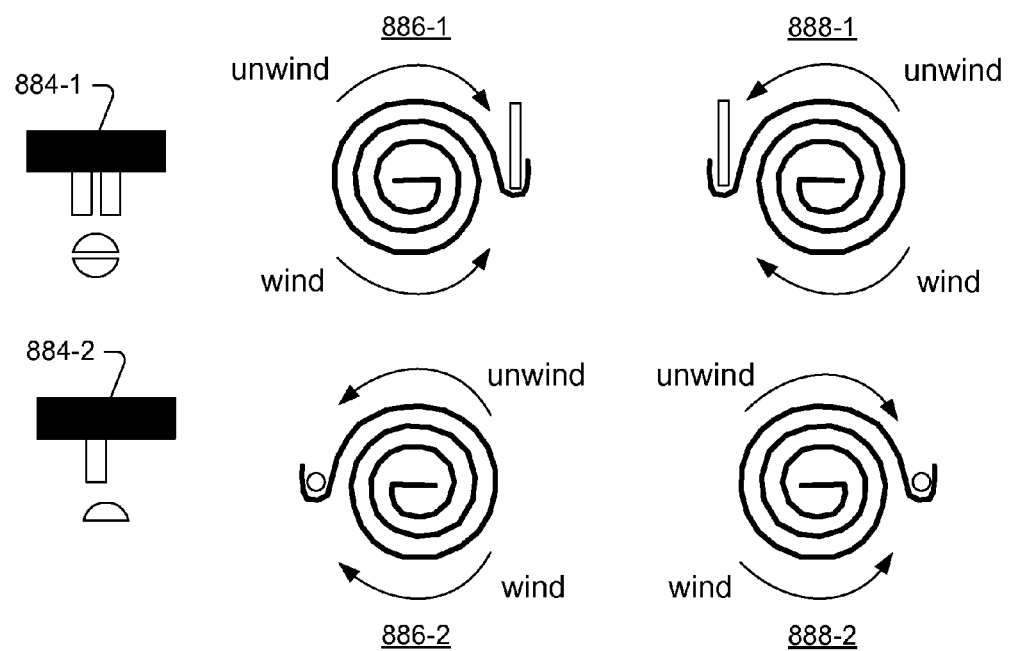

FIG. 8 shows an example of a device 810 that includes a translation mechanism 880 that includes one or more wheel assemblies 883, 885 that each operates using a respective windable and unwindable spring 886, 888. In the example of FIG. 8, the wheel assemblies 883, 885 may each include a wheel such as the wheel 884-1 or the wheel 884-2, which are configured to cooperate with a spring such that rotation of a wheel in one direction (e.g., CW, CCW) winds the spring and unwinding of the spring rotates the wheel in another direction (e.g., CW, CCW).

In the example of FIG. 8, the device 810 includes a bay 830 and a battery 840 disposed at least partially in the bay 830. As an example, a cable 885 may provide for making contact between contacts 846 of the battery 840 and contacts 896 of the device 810. The bay 830 may optionally include a recessed portion to accommodate the cable 885 as the battery 840 translates toward an end of the bay 830. As an example, a roller or other friction reduction mechanism 849 may be provided. As an example, such a mechanism may provide for tensioning the battery 840 (e.g., or battery assembly) in the bay 830 with respect to the one or more wheel assemblies 883, 885.

As an example, a latching mechanism may latch and unlatch a wheel of a wheel assembly. Where a wheel is unlatched, a spring may drive a battery towards one end of a bay, which may act to wind another spring as associated with another wheel, which likewise may be latched or unlatched by a latching mechanism. Where such latches are controlled by control circuitry, translation of the battery in the bay may be controlled to shift center of mass of a device.

Figure 9:
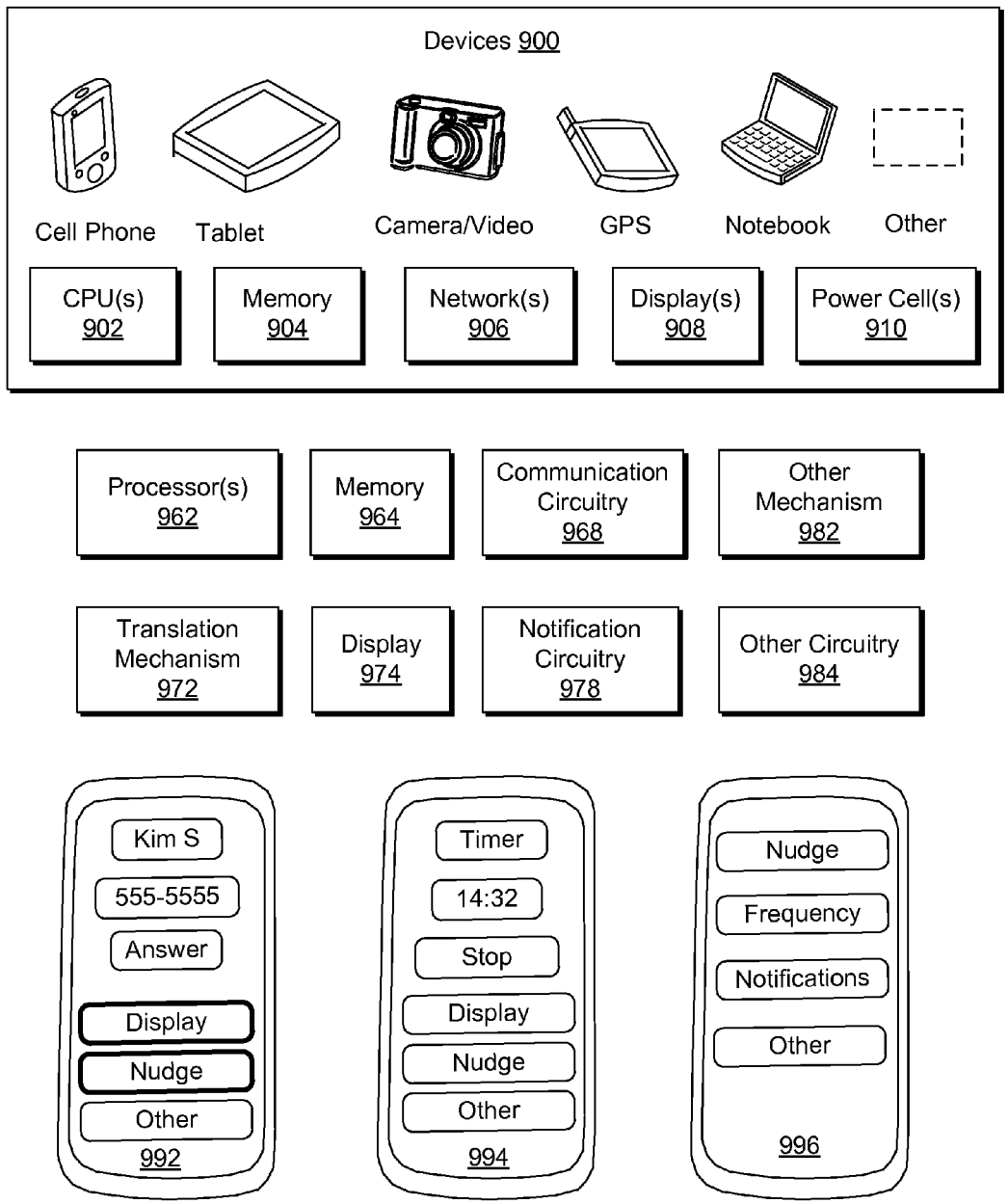
FIG. 9 is a diagram of examples of devices, circuitry and graphical user interfaces.

FIG. 9 shows some example devices 900 that may be powered by one or more power cells 910 (e.g., one or more batteries). For example, a cell phone, a tablet, a camera, a GPS device, a notebook computer, or other device may be powered by a power cell or cells. A device may include one or more processors 902, memory 904, one or more network interfaces 906, and one or more displays 908. A device, for example, one of the devices 900, may include a housing; a display coupled to the housing; circuitry coupled to the housing; a bay, formed at least in part by the housing, for receipt of a battery as a shiftable mass to shift center of gravity of the device, for example, responsive to a signal (e.g., a notification signal). For example, a tablet may include a tablet housing, a camera may include a camera housing, a GPS device may include a GPS device housing, a notebook computer may include a notebook computer housing, etc. In the example of FIG. 1 and FIG. 2, one or more components may form a housing (see, e.g., components 112, 116 and 118).

As an example, the one or more power cells 910 may include one or more of circuitry internal to a cell pack or external to a cell pack. As an example, the cell pack circuitry may include circuitry for communicating via 1 wire, 2 wires, etc. (e.g., Smart Battery technology). As an example, circuitry may act to control options as to mass shifting depending on state of a battery. For example, if a mass shifting mechanism relies on potential energy stored in the battery to move the battery, for a low state (e.g., battery "low"), circuitry may disable one or more mass shifting notifications to conserve potential energy stored in the battery. As another example, circuitry may act to control options as to mass shifting depending on orientation of a device, particularly orientation of a translational direction of a translatable battery of the device. For example, where the device is oriented such that a translational direction is aligned with gravity, options may be controlled as to overcoming gravity, acceleration with respect to gravity, etc. (e.g., depending on various factors, more even movement of a battery may occur when the battery moves in a plane normal to gravity compared to a direction aligned with gravity).

As an example, a device may include one or more processors 962, memory 964, communication circuitry 968, a translation mechanism 972, a display 974, notification circuitry 978, one or more other mechanisms 982 and other circuitry 984.

As an example, a device may include circuitry configured to render a graphical user interface (GUI) to a display. As an example, a GUI may include a configuration GUI 992 to select one or more notification modes such as "display", "nudge" or "other" for purposes of notification with respect to receipt of a communication. As an example, a GUI 994 may provide for selection of one or more notification modes for an event (e.g., timer or other event). As an example, a GUI 996 may provide for setting one or more parameters of a nudge notification mechanism that acts to shift center of mass of a device. For example, the GUI 996 shows a graphic control for frequency (e.g., or patterns), notification (e.g., for associations) and other settings.

Figure 10:
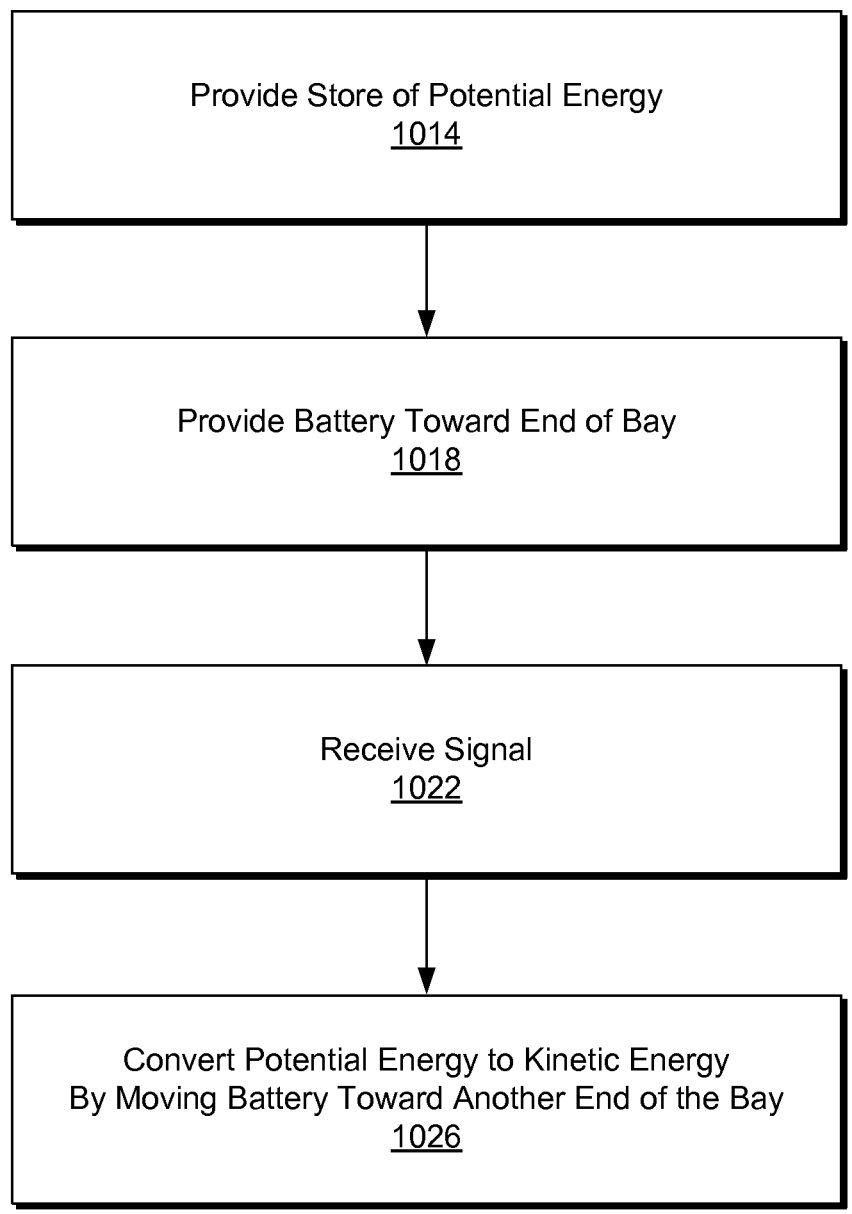
FIG. 10 is a diagram of an example of a method.

FIG. 10 shows an example of a method 1000 that includes a provision block 1014 for providing a store of potential energy, a provision block 1018 for providing a battery toward an end of a bay, a reception block 1022 for receiving a signal and a conversion block 1026, for, responsive to receipt of the signal, converting the potential energy to kinetic energy by moving the battery toward another end of the bay. In such a method, as to the signal, it may be, for example, a communication signal, a notification signal, or other signal. As an example, a method can include, after converting, latching a battery toward one of the ends of the bay.

As an example, a device may include a translation mechanism to provide directional "nudges" to a user, for example, as a form of feedback (e.g., for games, UI navigation, etc.), a quiet notification mechanism, etc. Such a "nudge" approach may cause a device shift center of mass appreciably (e.g., possibly position as well). Such an approach, may, depending on circumstances, be more noticeable than a rotational vibrator or magnetic field vibrator and may also be quieter.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 11:
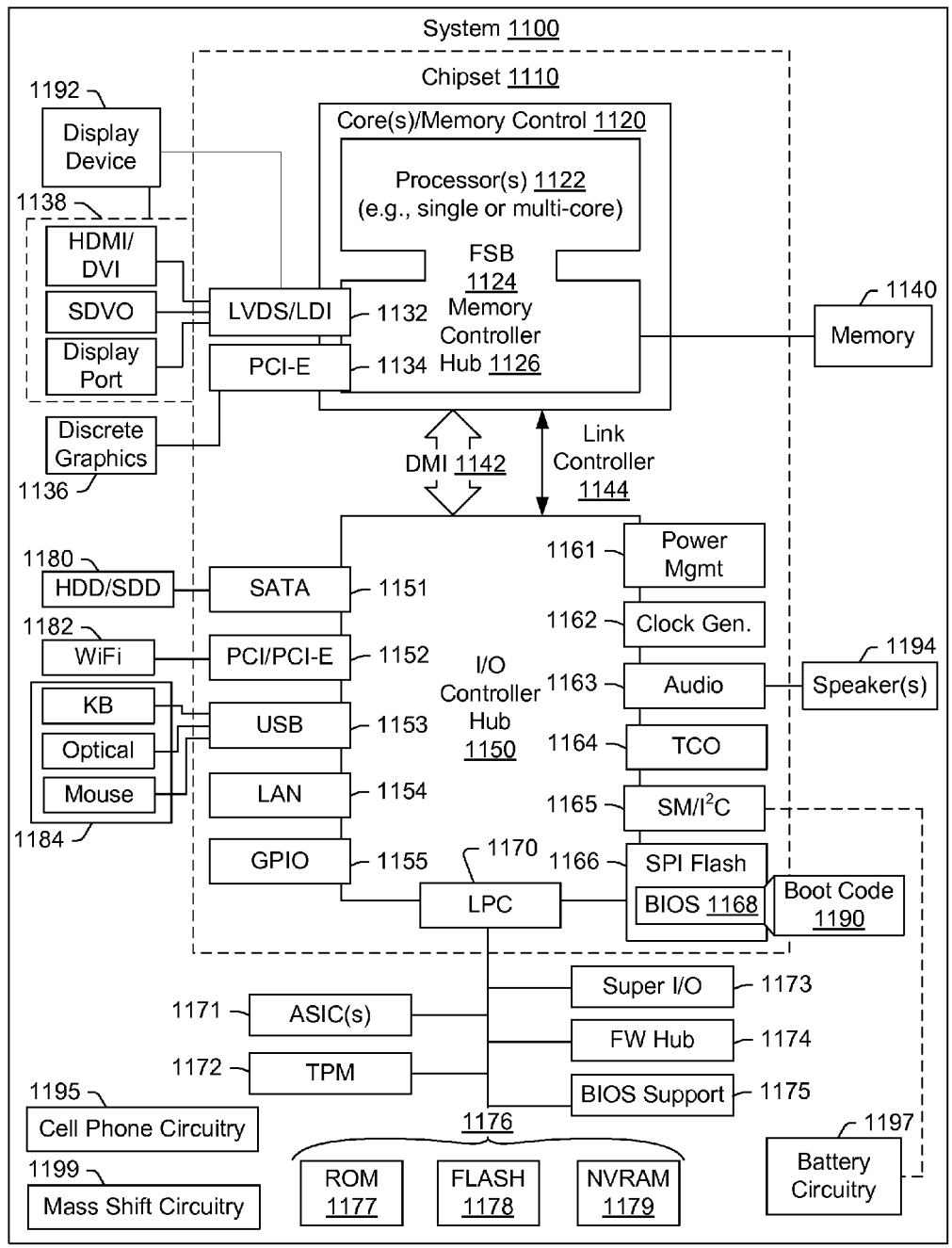
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As an example, a device such as one of the devices 900 of FIG. 9 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100 (see, e.g., the devices 110, 120, etc.). Also shown in FIG. 11 is battery circuitry 1197, which may provide one or more battery, power, etc., associated features (e.g., optionally to instruct one or more other components of the system 1100), as well as mass shift circuitry 1199 (e.g., to receive one or more signals to shift a mass, to latch a mass, etc., such as a battery mass or a batteries mass). As mentioned, a SMBus may be operable via a LPC (see, e.g., the LPC interface 1170), via an I²C interface (see, e.g., the SM/I²C interface 1165), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
a display operatively coupled to the processor;
a battery operatively coupled to the processor and having a battery length and a mass of at least 15% of a total mass of the device;
a chassis that comprises a bay having a bay length that exceeds the battery length;
a translation mechanism that translates the battery in the bay a distance greater than about 4 millimeters wherein the translation mechanism comprises a battery guide that guides the battery during translation, at least one elastic element, a first releasable latch that latches the battery at a first stationary position in the bay and a second releasable latch that latches the battery at a second stationary position in the bay wherein the first releasable latch releases the battery for translation toward the second stationary position and wherein the second releasable latch releases the battery for translation toward the first stationary position; and
communication circuitry operatively coupled to the processor and the translation mechanism.

2. The device of claim 1 wherein the battery comprises a lithium ion battery.

3. The device of claim 1 wherein the at least one elastic element comprises at least one spring.

4. The device of claim 1 wherein the battery comprises a battery mass that comprises at least 20% of a total mass of the device.

5. The device of claim 1 wherein the communication circuitry comprises activation circuitry to, responsive to receipt of a communication signal, activate the translation mechanism.

6. The device of claim 1 further comprising a rotatable eccentric mass wherein the communication circuitry is operatively coupled to the rotatable eccentric mass.

7. The device of claim 1 wherein the battery guide comprises a rail wherein the battery is coupled to the rail to guide translation of the battery in the bay.

8. An apparatus comprising:
a housing;
a display coupled to the housing;
a power supply component that comprises a mass of at least 15% of a total mass of the apparatus;
communication circuitry coupled to the housing;
a bay, formed at least in part by the housing, that comprises a guide that guides movement of the power supply component along a length of the bay;
springs at opposing ends of the bay that apply forces to the power supply component; and
a first releasable latch that latches the power supply component at a first stationary position along the length of the bay and a second releasable latch that latches the power supply component at a second stationary position along the length of the bay wherein the first releasable latch releases the power supply component for movement of the power supply component along the length of the bay a distance greater than about 4 millimeters toward the second stationary position and wherein the second releasable latch releases the power supply component for movement of the power supply component along the length of the bay a distance greater than about 4 millimeters toward the first stationary position.

9. The apparatus of claim 8 wherein at least one of the first releasable latch and the second releasable latch is releasable responsive to receipt of a signal issued by the communication circuitry.

10. The apparatus of claim 8 wherein the power supply component comprises a battery or a slidable cart and a battery wherein the slidable cart receives the battery.

* * * * *